(No Model.)
T. C. COYKENDALL.
SYSTEM OF ELECTRICAL DISTRIBUTION.
No. 525,445.  Patented Sept. 4, 1894.
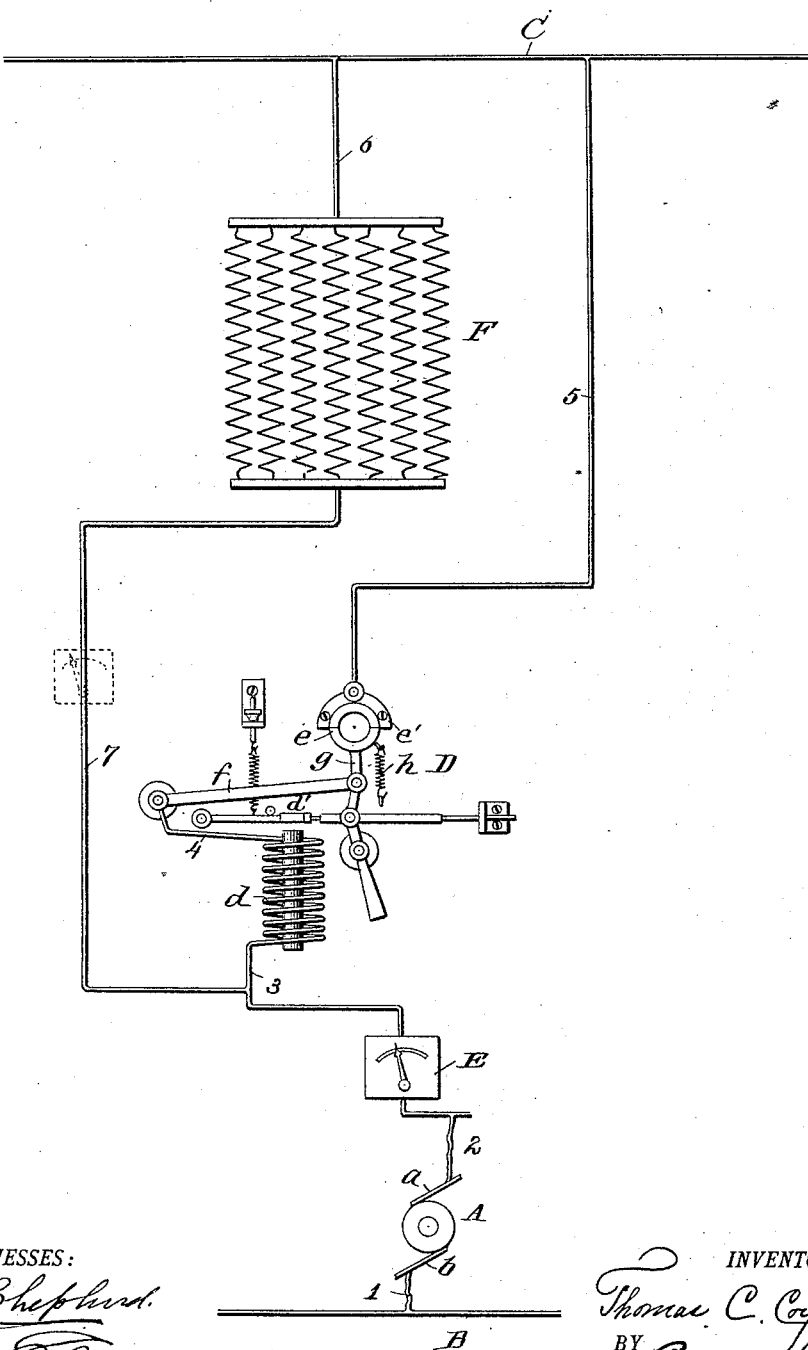

UNITED STATES PATENT OFFICE.

THOMAS C. COYKENDALL, OF RONDOUT, NEW YORK.

SYSTEM OF ELECTRICAL DISTRIBUTION.

SPECIFICATION forming part of Letters Patent No. 525,445, dated September 4, 1894.

Application filed January 4, 1894. Serial No. 495,591. (No model.)

*To all whom it may concern:*

Be it known that I, THOMAS C. COYKENDALL, a resident of Rondout, Ulster county, and State of New York, have invented a certain new and useful Improvement in Systems of Electrical Distribution, of which the following is a specification.

My invention relates to systems of electrical distribution, and has for its object to provide systems of distribution with a safety device which will indicate when it has become safe to throw in the break-switch after the same has been operated to break the main circuit.

My invention is specially applicable to electric railway systems wherein there is included in the main line an electro-magnetic break-switch which will be operated to break the circuit upon a sudden rise in the current due to a ground on line or analogous cause.

My invention consists in providing a relatively high resistance path to line, preferably in the form of a shunt around the terminals of the break-switch of such systems in order to maintain a constant path to line and providing the same with a suitable indicator for the current.

In the drawing, forming part hereof which is a diagrammatic view of an apparatus embodying one form of my invention, A represents the dynamo electric machine or other source of electric energy of an electric railway or other analogous system of distribution.

$a\ b$ are the brushes of the same, one of which is connected by wire 1 with one of the mains or leads B and the other connected through wire 2 and other apparatus, hereinafter described with the other main or lead C.

D is the break-switch or circuit-breaker of the system, and has its magnet $d$ and contact points $e\ e'$ included in the main line.

E is the station ammeter.

The circuit connections are as follows: The current passes from the positive brush of the machine $a$ by wire 2, through the station ammeter E, by wire 3, through magnet $d$, wire 4, arm $f$, link $g$, contact pieces $e\ e'$, wire 5, to the lead C. The current from the negative brush $b$ passes by wire 1 to the other lead B. The translating devices of the system are included in circuit across the leads B C, and in the case of an electric railway system, one of these leads B will be permanently grounded. When a ground comes on the line C or from any other cause, such as short circuiting, the current flowing is suddenly augmented, as will be readily understood, and the increased volume of the current passing through the magnet $d$ will cause the said magnet to pull down its armature $d'$ which will release the break-switch and cause the contact points $e$ $e'$ to be separated by the action of the spring $h$ in the usual manner. When this has happened, the line is broken and current no longer flows, and the machine is not subjected to the danger of being burned out by a current of great volume. This is the usual or normal arrangement of the break-switch in electrical railway systems of distribution, which, as will be seen, does not provide any means to indicate when the break-switch may be thrown back to close the main line. If the break-switch be thrown back while the line is still grounded, the circuit will be immediately broken at the break-switch in the same manner as before. The heavy current, however, flowing for a short space of time will have the effect of pitting the commutator at the point upon which the positive brush rested at the moment the break-switch was thrown back to close the main line. These defects I avoid by my invention in a manner to be described. According to my invention a resistance F is connected in shunt around the terminals of the break-switch by wires 6 and 7 connected to wires C and 3 respectively. The current which flows in this shunt is caused to actuate any suitable indicator, shown in this instance as the station ammeter included in the circuit therewith, although any indicator may be used either in circuit or within the range of electrical influence of the circuit.

In my improved construction as shown, during the normal operation of the system, when current is flowing, the greater part will pass to line through the break-switch and wire 5, only a small portion being shunted by way of wire 7, resistance F, and wire 6. When, now, the line becomes grounded, the break-switch will be automatically operated to open the main circuit. When this has been done, the only path for the current to line is by way of the shunt, but this path is of such high resistance that only a small amount of current can pass to line, which small volume will not be sufficient to in any manner damage the machine. A reading of this small current will be given on the station ammeter included in circuit which will remain deflected as long as a current flows, which will be until the ground on line has been broken. Or an indicator may be included directly in the shunt, as shown in dotted lines.

As soon as the ground has been broken or the trouble removed, current ceases to flow and the pointer of the ammeter will swing back to zero. As soon as the ammeter shows no reading, the break-switch may be thrown in to complete the circuit without danger to the machine. By watching the ammeter or indicator the attendant can at all times tell when the break-switch may be safely thrown in.

It will thus be seen that I have produced an extremely simple, cheap and efficient safety device and one which is not liable to get out of order, and which will at all times indicate whether or not the break-switch may be thrown in without danger to the machine.

I do not herein limit myself to the precise construction and arrangement shown, as it is obvious that the devices, their construction and arrangement may be greatly varied without departing from the spirit of my invention, but

What I claim, and desire to secure by Letters Patent, is—

1. In an electrical system of distribution, the combination of a dynamo electric machine, mains leading therefrom, a break-switch in series with one of the mains, a relatively high resistance shunt around the break-switch, and means for indicating the flow of current in the shunt when the break-switch is open, substantially as described.

2. In a system of electrical distribution, the combination of a dynamo electric machine, mains leading therefrom, an electro-magnetic break-switch in series with one of the mains, a relatively high resistance shunt around the terminals of the break-switch, and a current indicator in circuit with the shunt when the break-switch is open, substantially as described.

3. In a system of distribution, the combination of a dynamo-electric machine, mains leading therefrom, an electro-magnetic break-switch in series with one of the mains, a relatively high resistance shunt around the break-switch, and an ammeter in circuit with the shunt, substantially as described.

4. In a system of distribution, the combination of a source of electrical energy, mains leading therefrom, a break-switch in series with one of the mains, a high resistance path to line, forming the sole path to line when the break-switch is open and means for indicating the flow of current in said high resistance path when the break-switch is open, substantially as described.

5. In a system of electrical distribution, the combination of a source of electrical energy, mains leading therefrom, a break-switch in circuit with the mains, a separate normally completed high resistance path to line, forming the sole path to line when the break-switch is open and means for indicating the flow of current in the said high resistance path when the break-switch is open, substantially as described.

6. In a system of electrical distribution, the combination of a source of electric energy, mains leading therefrom, a break-switch in circuit with the mains, a shunt around the terminals of the break-switch, a resistance included in the shunt, and a current indicator in circuit with the shunt when the break-switch is open, substantially as described.

THOMAS C. COYKENDALL.

Witnesses:
 GEO. E. MORSE,
 HARRY M. TURK.